USO12449878B2

(12) United States Patent
Gao et al.

(10) Patent No.: US 12,449,878 B2
(45) Date of Patent: Oct. 21, 2025

(54) EXITING OF LOW POWER MODES OF REDRIVERS AND RETIMERS

(71) Applicant: PARADE TECHNOLOGIES, LTD., San Jose, CA (US)

(72) Inventors: Mengchuan Gao, Shanghai (CN); Hongquan Wang, Shanghai (CN); Shengyuan Zhang, Shanghai (CN); Yuanping Chen, Cupertino, CA (US); Jianhong Li, Shanghai (CN)

(73) Assignee: PARADE TECHNOLOGIES, LTD., San Jose, CA (US)

( * ) Notice: Subject to any disclaimer, the term of this patent is extended or adjusted under 35 U.S.C. 154(b) by 242 days.

(21) Appl. No.: 18/241,833

(22) Filed: Sep. 1, 2023

(65) Prior Publication Data

US 2025/0076958 A1 Mar. 6, 2025

(51) Int. Cl.
*G06F 1/32* (2019.01)
(52) U.S. Cl.
CPC .................................. *G06F 1/32* (2013.01)
(58) Field of Classification Search
CPC ........................................................ G06F 1/32
USPC ......................................................... 713/320
See application file for complete search history.

(56) References Cited

U.S. PATENT DOCUMENTS

| | | | |
|---|---|---|---|
| 9,621,383 B1* | 4/2017 | Urienza | H04L 25/085 |
| 12,088,293 B2* | 9/2024 | Maung | H03K 19/018521 |
| 2011/0063010 A1* | 3/2011 | Namkoong | H03K 19/018528 |
| | | | 327/306 |
| 2012/0311359 A1* | 12/2012 | Jaramillo | H04L 25/0298 |
| | | | 713/321 |
| 2014/0022014 A1* | 1/2014 | Reisiger | H03F 3/45928 |
| | | | 330/253 |
| 2015/0067209 A1* | 3/2015 | Liu | H03K 5/156 |
| | | | 710/106 |
| 2021/0049956 A1* | 2/2021 | Yeh | G09G 5/008 |
| 2021/0055963 A1* | 2/2021 | An | H04L 12/10 |
| 2021/0181832 A1* | 6/2021 | Ansari | G06F 1/3209 |
| 2021/0383749 A1* | 12/2021 | Yeh | G09G 3/32 |
| 2022/0391345 A1* | 12/2022 | Kamath | G06F 1/3215 |
| 2024/0290248 A1* | 8/2024 | Kim | G09G 3/2096 |

* cited by examiner

*Primary Examiner* — Jaweed A Abbaszadeh
*Assistant Examiner* — Cheri L Harrington
(74) *Attorney, Agent, or Firm* — Morgan, Lewis & Bockius LLP

(57) ABSTRACT

This application is directed to controlling a low power mode of a data communication channel. An electronic device includes an input interface for receiving an input signal. A signal conditioning circuit is coupled to the input interface, and configured to be disabled and consume power below a first threshold power level in a low power mode. A first signal detector is coupled to the signal conditioning circuit, and a second signal detector is coupled to the first signal detector. The first signal detector is configured to monitor a differential mode component of the input signal for controlling the signal conditioning circuit to exit the low power mode. The second signal detector is configured to, in the low power mode, detect a start of the input signal and enable the first signal detector based on a common mode component of the input signal.

20 Claims, 9 Drawing Sheets

EXITING OF LOW POWER MODES OF REDRIVERS AND RETIMERS

TECHNICAL FIELD

The disclosed embodiments relate generally to data transmission technology, including methods, systems, and devices for controlling low power modes of a data interface (e.g., including redrivers and retimers) in a high-speed data communication channel.

BACKGROUND

Many electronic devices are physically coupled to each other and communicate with each other using data links and interfaces that comply with high-speed serial computer expansion bus standards (e.g., Peripheral Component Interconnect (PCI) Express). These bus standards allow the application of retimers and redrivers to extend the channel reach at a high data speed. A redriver is an analog extension device designed to boost portions of a signal to counteract attenuation caused by signal propagation over a physical interconnect of a corresponding data link. A retimer is a mixed-signal device that is standard-aware and has an ability to fully recover the data, extract the embedded clock, and retransmit a fresh copy of the data using a clean clock. Compared with a redriver, a retimer actively participates in applying the bus standard to implement negotiation, timeouts, bit manipulation, jitter resetting, signal equalization, skew correction, and many other functions.

Redrivers and retimers normally remains in a low power state when there is no data communicated via the redrivers or retimers. When an electronic device starts sending high speed data to the redrivers or retimers, the redrivers or retimers need a control signal to control its mainlink to exit the low power state. It would be beneficial to exit the low power state of a redriver or retimer efficiently without consuming excessive power.

SUMMARY

This application is directed to methods, electronic systems, electronic devices, electronic circuits, data links, data ports, and data interfaces that control (e.g., exit) a low power mode or state of a data interface (e.g., including redrivers and retimers) of a data link with a substantially low power. Examples of data communication protocols applied in such a data link include, but are not limited to, Universal Serial Bus (USB) 3, USB 4, DisplayPort (DP) 2.1, DP 2.4, High-Definition Multimedia Interface (HDMI) 1.4, and HDMI 2.0. Examples of the low power state include, but are not limited to, a U3 state, a D3 state, a CLO state, and a modern standby state. An electronic device coupled to the data link does not send any signal to the data link in the low power state, and starts to send a data signal when the electronic device exits the low power state. The data signal is detected by a detector, and enables the redriver or retimer to exit the low power state. In various embodiments of this application, a data interface of the data link includes two signal detectors configured to monitor an input signal received at the data interface. A first signal detector is configured to monitor a differential mode component of the input signal for controlling a signal conditioning circuit (e.g., including a retimer or redriver) to exit the low power mode. A second signal detector is coupled to the first signal detector. The second signal detector is configured to, in the low power mode, detect the start of the input signal and enable the first signal detector based on a common mode component of the input signal. The first signal detector consumes more power than the second signal detector, and is disabled from signal detection in the low power mode until it is enabled by the first signal detector. By these means, power consumption of the data interface is preserved in the low power mode, while the input signal is reliably detected jointly by the first and second signal detectors.

In one aspect, a method is implemented at an electronic device for controlling the low power mode of a data communication channel. The method includes disabling at least part of a signal conditioning circuit in a lower power mode to control power consumption below a first threshold power level and monitoring an input interface for receiving an input signal by a second signal detector. The method further includes, based on a common mode component of the input signal, detecting the start of the input signal and enabling a first signal detector. The method further includes monitoring a differential mode component of the input signal by the first signal detector. The method further includes, based on the differential mode component, controlling the signal conditioning circuit to exit the low power mode of the signal conditioning circuit.

In another aspect, a non-transitory computer-readable storage medium stores one or more programs to be executed by one or more processors. The one or more programs include instructions for implementing any of the above methods for controlling the low power mode in a data interface of a data communication channel.

In another aspect, an electronic device includes an input interface for receiving an input signal, a signal conditioning circuit coupled to the input interface, a first signal detector coupled to the signal conditioning circuit, and a second signal detector coupled to the first signal detector. The signal conditioning circuit is configured to be disabled and consume power below a first threshold power level in a low power mode. The first signal detector is configured to monitor a differential mode component of the input signal for controlling the signal conditioning circuit to exit the low power mode. The second signal detector is configured to, in the low power mode, detect the start of the input signal and enable the first signal detector based on a common mode component of the input signal.

In yet another aspect, a controller circuit is applied to control a signal conditioning circuit. The controller circuit includes an input interface for receiving an input signal and two first signal detectors. The first signal detector is coupled to the signal conditioning circuit, and configured to monitor a differential mode component of the input signal for controlling the signal conditioning circuit to exit a low power mode. The signal conditioning circuit is configured to be disabled and consume power below a first threshold power level in the low power mode. The second signal detector is coupled to the first signal detector, and configured to, in the low power mode, detect the start of the input signal and enable the first signal detector based on a common mode component of the input signal.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Figure 1:
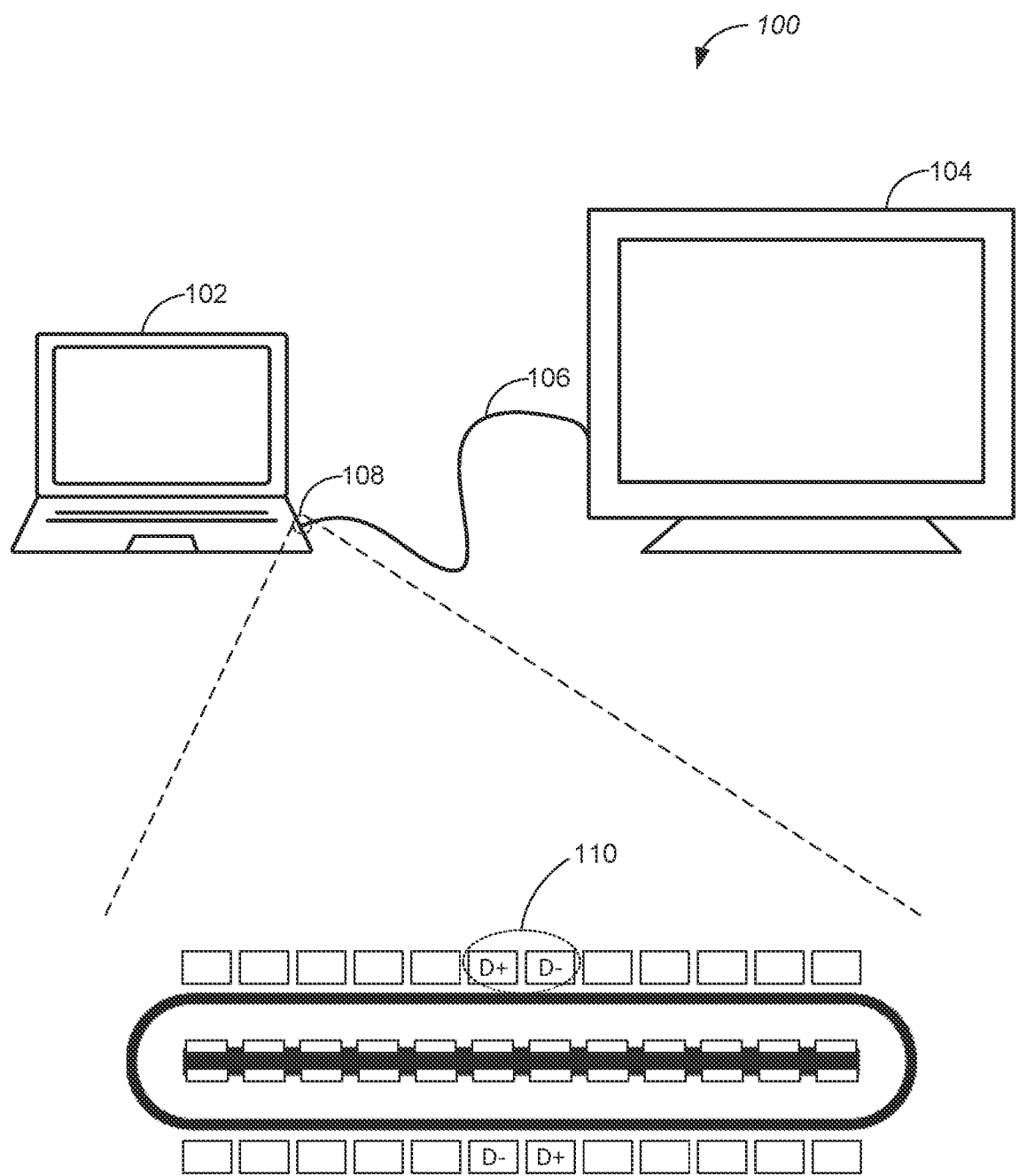
FIG. 1 is a block diagram of an example electronic system in which electronic devices are electrically connected via a data link, in accordance with some embodiments.

FIG. 1 is a block diagram of an example electronic system 100 in which a first electronic device 102 is electrically coupled to a second electronic device 104 via a data link 106, in accordance with some embodiments. The first electronic device 102 and second electronic device 104 are configured to exchange data via the data link 106. In some embodiments, the first electronic device 102 includes a video source, and the second electronic device 104 includes a display device. The display device has a screen configured to display visual content provided by the first electronic device 102 via the data link 106. In another example not shown, the first electronic device 102 is a desktop computer and the second electronic device 104 is a mobile phone that exchanges data with the desktop computer via the data link 106. Examples of the electronic devices 102 and 104 include, but are not limited to, a desktop computer, a laptop computer, a tablet computer, a video player, a camera device, a gameplayer device, and other formats of electronic devices that are configured to provide data or receive data. Video data, audio data, text, program data, control data, configuration data, or any other data is transmitted between the first and second electronic devices 102 and 104 via the data link 106.

Connectors 108 include connectors incorporated into electronic devices as well as connectors at the ends of cables, such as the data link cable 106. The data link cable 106 includes a connector 108 at each end. The two data link connectors 108 are configured to connect the data link 106 to respective connectors 108 of the first electronic device 102 and second electronic device 104. In some embodiments, the connectors 108 are DisplayPort connectors having a digital display interface developed by a consortium of personal computer and chip manufacturers and standardized by the Video Electronics Standards Association (VESA). The DisplayPort connectors are configured to connect the data link 106 to the first electronic device 102 and carry video, audio, and control data according to a data communication protocol. In another example, the connectors 108 are universal serial bus (USB) connectors (e.g., configured to connect a computer to a peripheral device). Exemplary types of USB connectors include, but are not limited to, USB-A, USB-B, USB-C, USB Micro-A, USB Micro-B, USB Mini-B, USB 3.0A, USB 3.0B, USB 3.0 Micro B, and USB Micro-AB. Further, a data communication protocol of USB4 is applied to communicate data using a USB-C connector, thereby providing a throughput of up to 40 Gbps, power delivery of up to 100 W, support for 4K and 5K displays, and backward compatibility with USB 3.2 and USB 2.

In some embodiments, the connectors 108 include a bidirectional channel for communicating a stream of data between the first and second electronic devices 102 and 104. The bidirectional channel of the connectors 108 include two data lanes and a pair of differential pins 110 coupled to the two data lanes. The pair of differential pins 110 is configured to receive a differential input signal from the first electronic device 102 or the second electronic device 104, and the differential input signal carries a serial data command or serial content data (e.g., video or audio data) that is communicated via the two data lanes of the connectors 108. As such, the two data lanes and pair of differential pins 110 of the connectors 108 are configured to facilitate bidirectional communication between the first electronic device 102 and the second electronic device 104. The bidirectional channel is a data channel or an auxiliary channel. Specifically, the auxiliary channel of the connectors 108 is used for communication of additional serial data beyond video and audio data, such as consumer electronics control (CEC) commands. In some embodiments, the pair of differential pins 110 is coupled to a dedicated set of twisted-pair wires configured to carry two input signals of the differential input signal.

Each connector 108 of the data link 106 is configured to be coupled to a respective connector 108 of the first electronic device 102 or a respective connector 108 of the second electronic device 104. Each connector 108 of the data link 106 is bidirectional, and so is each connector 108 of the electronic devices 102 and 104. When a connector 108 of the data link 106 is coupled to the first or second electronic device 102 or 104, the pair of differential pins 110 of the connector 108 of the data link 106 is physically and electrically coupled to a pair of differential pins 110 of the connector 108 of the first or second electronic device 102 or 104. The pair of differential pins 110 of the connector 108 of the first or second electronic device 102 or 104 is configured to receive data from, or transmit data to, the differential pins 110 of the connector 108 of the data link 106.

Figure 2:
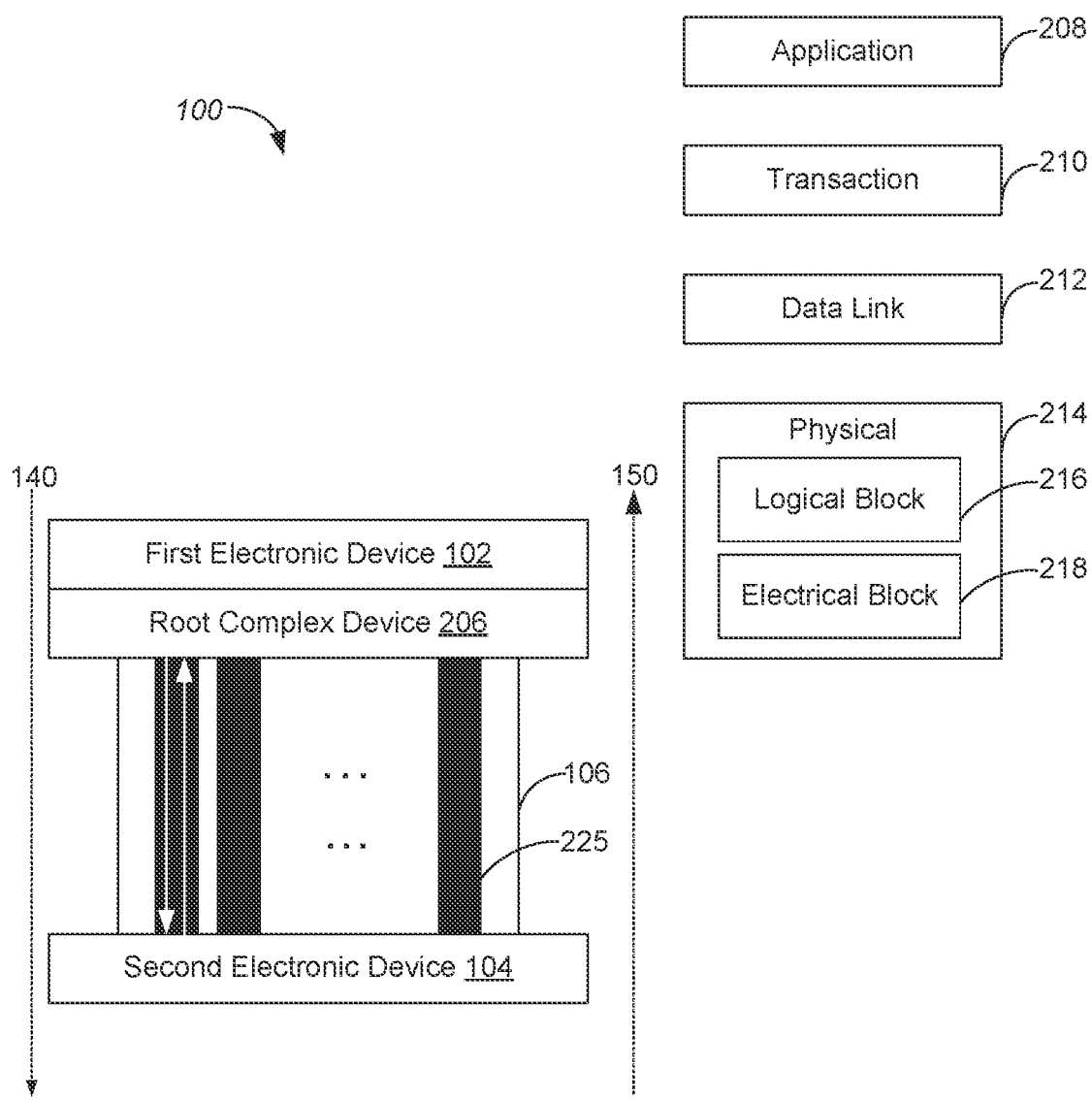
FIG. 2 is an example PCI Express electronic system in which a first electronic device or component is electrically coupled to a second electronic device or component via a data link, in accordance with some embodiments.

FIG. 2 is an example PCI Express electronic system 100 in which a first electronic device or component 102 is electrically coupled to a second electronic device or component 104 via a data link 106, in accordance with some embodiments. In an example, the first electronic device 102 includes a central processing unit (CPU) of a personal computer, and the second electronic device 104 is a peripheral component of the personal computer, such as a graphics card, a hard drive, a solid state drive, a Wi-Fi communication module, or an Ethernet card. The data link 106 includes a connection port for receiving from the second electronic device 104. The connection port is optionally formed on the mother board of the personal computer. The data link 106 complies with PCI Express (i.e., PCIe), which is a high-speed serial computer expansion bus standard, and provides an interface to communicate data packets between the first and second electronic devices 102 and 104 in compliance with the PCI Express. The data link 106 is a serial data bus including one or more data transmission channels 225. Each channel 225 includes two wire sets for transmitting and receiving data packets, thereby supporting full-duplex communication between the first and second electronic devices 102 and 104. In some examples, the data link 106 has 1, 4, 8, or 16 channels 225 coupled in a single data port of the data link 106. For each lane, the two wire sets correspond to a downstream data direction 140 or an upstream data direction 150 (defined with respect to the first electronic device 102). In some embodiments, each wire set includes two wires for carrying a pair of differential signals.

In some embodiments, the first electronic device 102 includes or is coupled to a root complex device 206 that is further coupled to the data link 106. The root complex device 206 is configured to generate requests for transactions including a series of one or more packet transmissions on behalf of the first electronic device 102. Examples of the transactions include, but are not limited to, Memory Read, Memory Read Lock, IO Read, IO Write, Configuration Read, Configuration Write, and Message. In some embodiments, the first electronic device 102 is coupled to one or more additional electronic devices besides the second electronic device 104. The data link 106 includes one or more switch devices to couple the root complex device 206 of the first electronic device 102 to multiple endpoints including the second electronic device 104 and additional electronic devices not shown in FIG. 1.

PCI Express is established based on a layered model including an application layer 208, a transaction layer 210, a data link layer 212, and a physical layer 214. As the top layer, the application layer 208 is implemented in software programs, such as Ethernet, NVMe, SOP, AHCI, and SATA. In the transaction layer 210, each transaction of a series of packet transmissions is implemented as requests and responses separated by time. For example, a memory-related transaction is translated to device configuration and control data transferred to or from the second electronic device 104 (e.g., a memory device). Data packets associated with each transaction are managed by data flows on the data link layer 212. The physical layer 214 of PCI Express controls link training and electrical (analog) signaling, and includes a logical block 216 and an electrical block 218. The logical block 216 defines ordered data sets in training states, and the electrical block 218 defines eye diagram characteristics and analog waveforms. Each layer of the layered model includes first specifications for a transmitting end where a root complex device 206 is coupled and second specifications for a receiving end where a peripheral component (i.e., the second electronic device 104) is coupled.

As high frequency signals are transmitted within the channels 225 of the data link 106, these signals are distorted and spread over sequential symbols and result in inter symbol interferences (ISI) and bit errors at the receiving end of the second electronic device 104. These ISI and bit errors can be suppressed by a feed-forward equalizer (FFE) that is coupled serially on a path of the data link 106 and configured with equalization settings using an equalization procedure. In an example, the FFE includes a finite impulse response (FIR) filter. The equalization procedure is implemented when a high-speed data transfer rate needs to be initialized, when an equalization request is issued from the application layer 208, or when a BER (bit error rate) exceeds a data error tolerance. In some embodiments, initiation and termination of the equalization procedure are detected on the physical layer 214 based on data packets transferred over the data link 106.

Figure 3A:
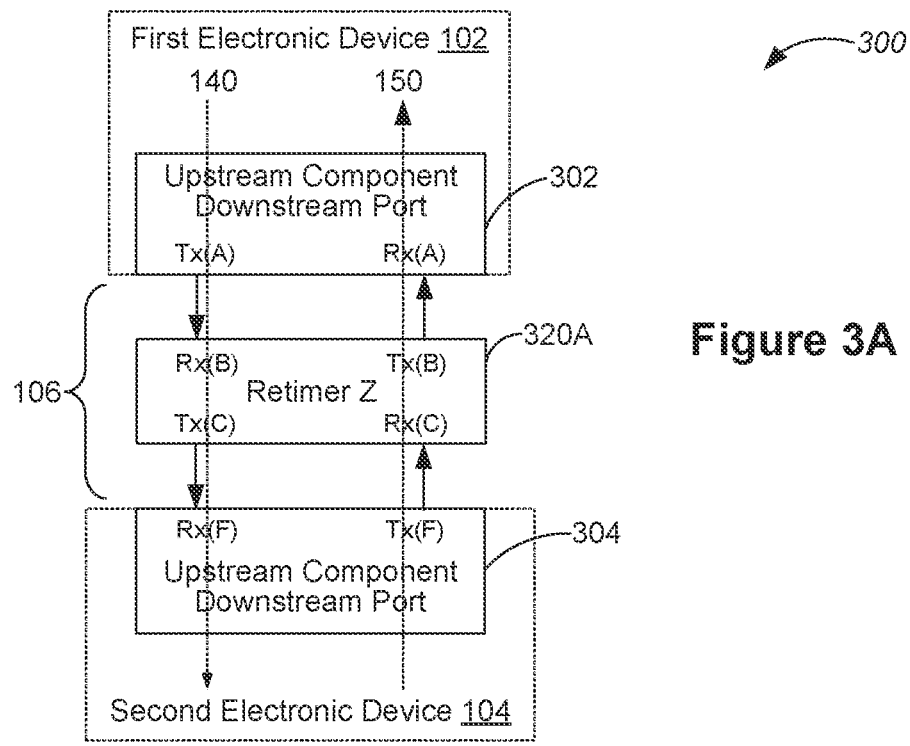
FIGS. 3A and 3B are two example electronic systems in which a data link is coupled between two electronic devices or components and includes at least one retimer, in accordance with some embodiments.
Figure 3B:
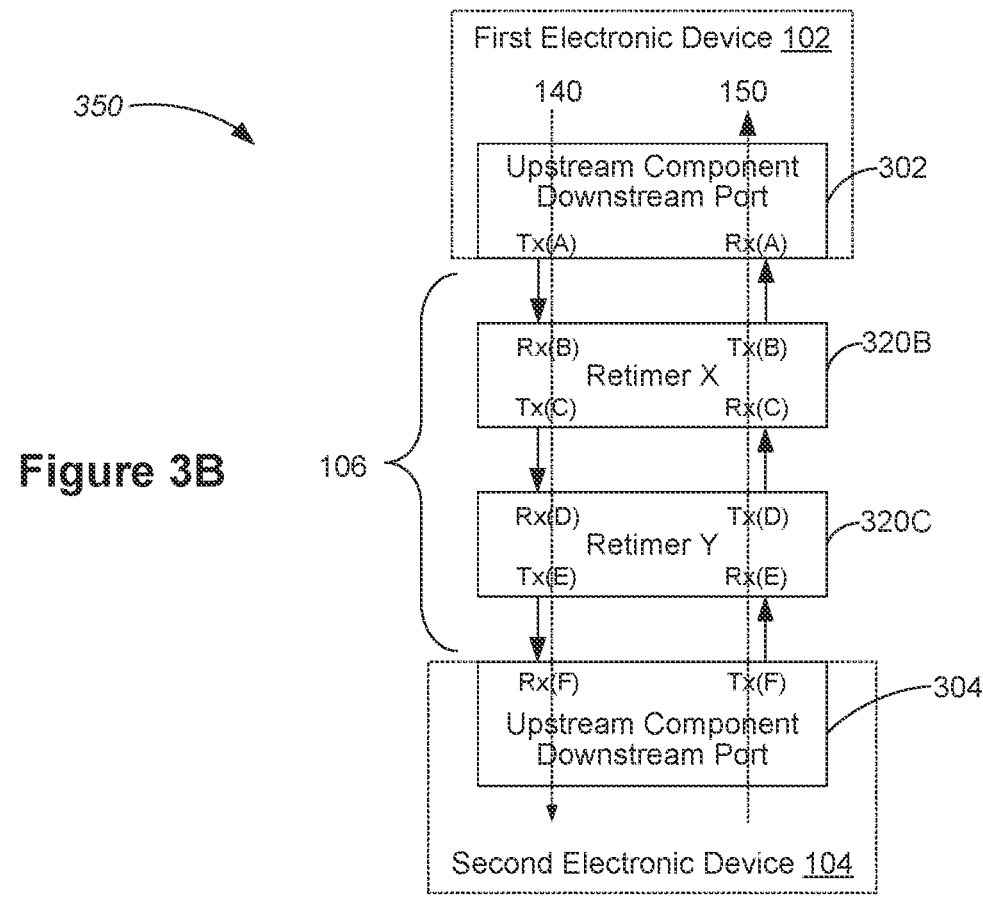

FIGS. 3A and 3B are two example electronic systems 300 and 350 in which a data link 106 is coupled between two electronic devices or components 102 and 104 and includes at least one retimer 320 (e.g., the retimers 320A, 320B, and 320C), in accordance with some embodiments. A retimer 320 is a mixed-signal device that is configured to transmit data packets actively (i.e., extract an embedded clock and recover the data packets in compliance with a bus standard, such as PCI Express). In an example, the retimer has a continuous time linear equalizer (CTLE), a wideband gain stage, and one or more of a clock and data recovery (CDR) circuit, a decision feedback equalizer (DFE), and a finite impulse response (FIR) driver. A state machine and/or a microcontroller is used in the retimer 320 to manage the CTLE, the wideband gain stage, the DFE, and the FIR driver, and implement a link training and status state machine (LTSSM).

The data link 106 enables bidirectional data communication between the electronic devices 102 and 104. A first electronic device 102 includes an upstream component 302 having a transmitting interface Tx(A) and a receiving interface Rx(A), and a second electronic device 104 includes a downstream component 304 having a receiving interface Rx(F) and a transmitting interface Tx(F). Each retimer 320 of the data link 106 is coupled between the electronic devices 102 and 104, and has a receiving interface Rx and a transmitting interface Tx for each of the downstream data direction 140 and the upstream data direction 150. Referring to FIG. 3A, the data link 106 includes only one retimer 320A. In some embodiments, the retimer 320A is disposed in proximity to the upstream component 302 of the first electronic device 102 or the downstream component 304 of the second electronic device 104. The receiving interface Rx(B) and the transmitting interface Tx(B) of the retimer 320A are coupled to the transmitting interface Tx(A) and receiving interface Rx(A) of the first electronic device 102, respectively. Another transmitting interface Tx(C) and another receiving interface Rx(C) of the retimer 320A are coupled to the receiving interface Rx(F) transmitting interface Tx(F) of the second electronic device 104, respectively. As such, data packets are transmitted between the electronic devices 102 and 104, either sequentially through the interfaces Tx(A), Rx(B), Tx(C), and Rx(F) on the downstream data direction 140 or sequentially through the interfaces Tx(F), Rx(C), Tx(B), and Rx(A) on the upstream data direction 150.

Referring to FIG. 3B, the data link 106 includes two retimers 320B and 320C that are electrically coupled in series between the first and second electronic devices 102 and 104. In an example, the first retimer 320B is disposed in proximity to the upstream component 302 of the first electronic device 102, and the second retimer 320C is disposed in proximity to the downstream component 304 of the second electronic device 104. A receiving interface Rx(B) and a transmitting interface Tx(B) of the first retimer 320B are coupled to the transmitting interface Tx(A) and receiving interface Rx(A) of the first electronic device 102, respectively. Another transmitting interface Tx(C) and another receiving interface Rx(C) of the first retimer 320B are coupled to a receiving interface Rx(D) and a transmitting interface Tx(D) of the second retimer 320C, respectively. Another transmitting interface Tx(E) and another receiving interface Rx(E) of the second retimer 320C are coupled to the receiving interface Rx(F) and transmitting interface Tx(F) of the second electronic device 104, respectively. As such, data packets are transmitted between the electronic devices 102 and 104, either sequentially through the interfaces Tx(A), Rx(B), Tx(C), Rx(D), Tx(E), and Rx(F) on the downstream data direction 140 or sequentially through the interfaces Tx(F), Rx(E), Tx(D), Rx(C), Tx(B), and Rx(A) on the upstream data direction 150.

Figure 4A:
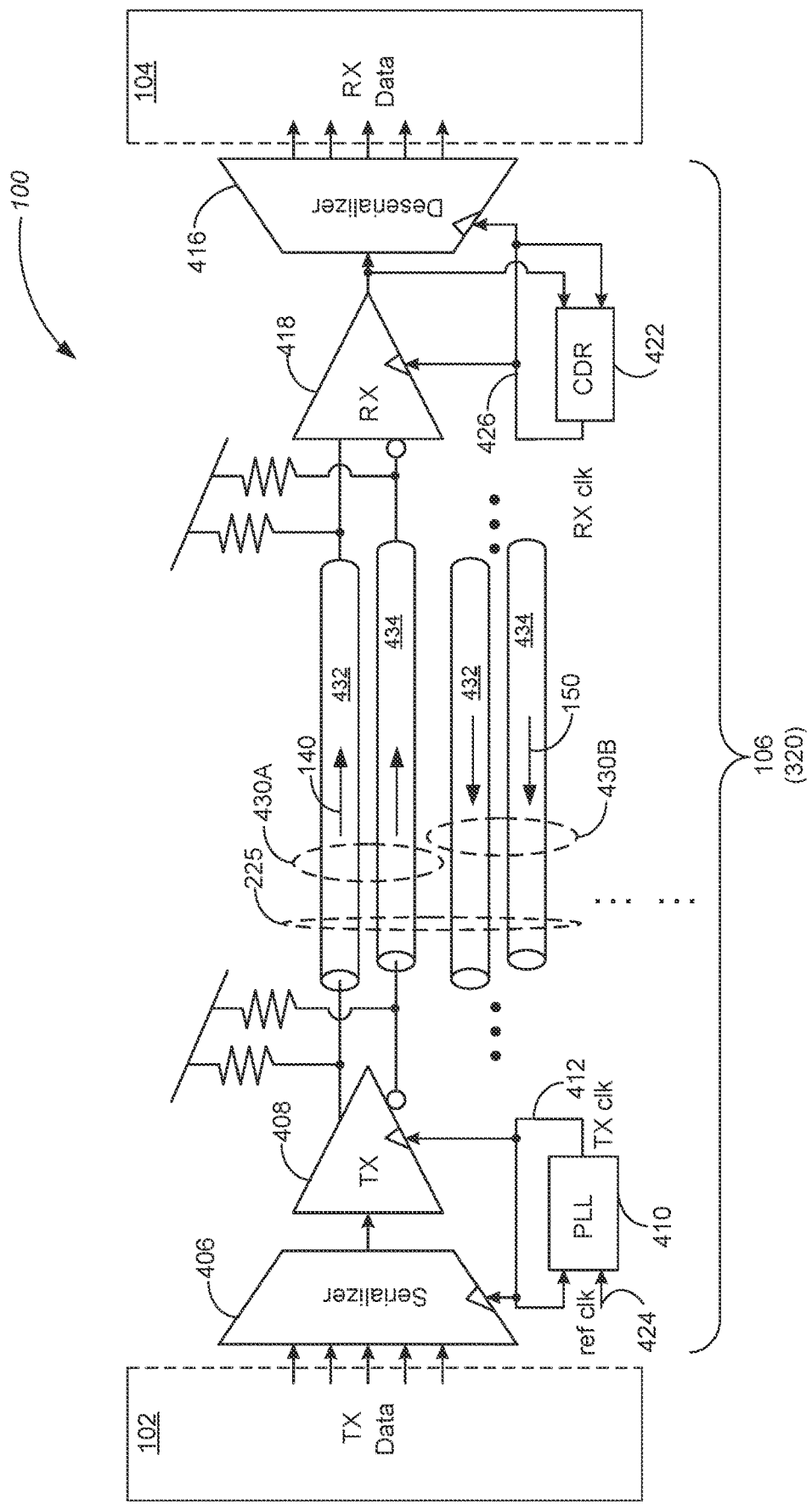
FIG. 4A is a block diagram an example electronic system in which a first electronic device or component is electrically coupled to a second electronic device or component via a data link, in accordance with some embodiments.
Figure 4B:
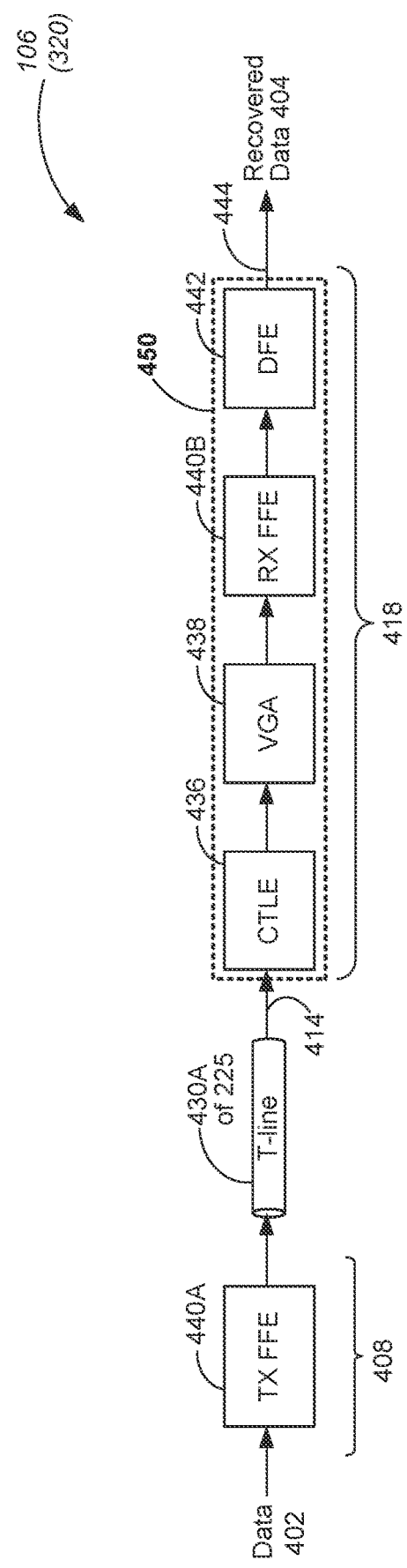
FIG. 4B is a block diagram of an example data link including a plurality of modulation circuits, in accordance with some embodiments.

FIG. 4A is a block diagram of an example electronic system 100 in which a first electronic device or component 102 is electrically coupled to a second electronic device or component 104 via a data link 106, in accordance with some embodiments, and FIG. 4B is a block diagram of an example data link 106 including a plurality of modulation circuits 450, in accordance with some embodiments. In an example, the first electronic device 102 includes a central processing unit (CPU) of a personal computer, and the second electronic device 104 is a peripheral component of the personal computer, such as a graphics card, a hard drive, a solid state drive, a Wi-Fi communication module, or an Ethernet card. The data link 106 includes a connection port for receiving data from the second electronic device 104. The connection port is optionally formed on the mother board of the personal computer. In some embodiments, the data link 106 complies with a high-speed serial computer expansion bus standard (e.g., PCI Express (PCIe) or USB 4) and provides an interface to communicate data packets between the first and second electronic devices 102 and 104 in compliance with the bus standard. The data link 106 is a serial data bus including one or more data channels 225. In some embodiments, each data channel 225 includes two wire sets 430A and 430B (also called two data lanes) for transmitting and receiving data packets, respectively, thereby supporting full-duplex communication between the first and second electronic devices 102 and 104. In some examples, the data link 106 has 1, 4, 8, or 16 channels coupled in a single data port of the data link 106. For each data channel 225, the two wire sets 430A and 430B correspond to a downstream data direction 140 and an upstream data direction 150 defined with respect to the first electronic device 102, respectively. In some embodiments, each wire set 430A or 430B includes two respective wires 432 and 434 for carrying a pair of differential signals.

In some embodiments, the first electronic device 102 includes or is coupled to a root complex device (not shown) that is further coupled to the data link 106. The root complex device is configured to generate requests for transactions including a series of one or more packet transmissions on behalf of the first electronic device 102. Examples of the transactions include, but are not limited to, Memory Read, Memory Read Lock, Input Output (IO) Read, IO Write, Configuration Read, Configuration Write, and Message. In some embodiments, the first electronic device 102 is coupled to one or more additional electronic devices besides the second electronic device 104. The data link 106 includes one or more switch devices to couple the root complex device of the first electronic device 102 to multiple endpoints including the second electronic device 104 and additional electronic devices not shown in FIGS. 1 and 2.

A data transmission protocol (e.g., PCI Express, USB4 v2.0, or DisplayPort 2.1) is established based on a layered model including an application layer 208, a transaction layer 210, a data link layer 212, and a physical layer 214. As the top layer, the application layer 208 is implemented in software programs, such as Ethernet, NVMe, SOP, AHCI, and SATA. In the transaction layer 210, each transaction of a series of packet transmissions is implemented as requests and responses separated by time. For example, a memory-related transaction is translated to device configuration and control data transferred to or from the second electronic device 104 (e.g., a memory device). Data packets associated with each transaction are managed by data flows on the data link layer 212. The physical layer 214 controls link training and electrical (analog) signaling, and includes a logical block and an electrical block. The logical block 216 defines ordered data sets in training states, and the electrical block 218 defines eye diagram characteristics and analog waveforms. Each layer of the layered model includes first specifications for the transmitting side where a root complex device is coupled and second specifications for the receiving side where a peripheral component (i.e., the second electronic device 104) is coupled.

As signals are transmitted within the wire sets 430A and 430B of each data channel 225 of the data link 106, the signals are distorted and spread over sequential symbols. This results in inter symbol interferences (ISI) and bit errors at the receiving side of the second electronic device 104. In some embodiments, these ISI and bit errors can be suppressed by a feed-forward equalizer (FFE) that is coupled serially on a path of the data link 106 and configured with equalization settings using an equalization procedure. For example, an equalization procedure is implemented when a high-speed data transfer rate needs to be initialized, when an equalization request is issued from the application layer, or when the bit error rate (BER) exceeds the data error tolerance.

The electronic system 100 includes a serializer and deserializer (SERDES) system corresponding to the data link 106. The SERDES system of the data link 106 includes a serializer 406, a transmitter 408, the data channel 225, a receiver 418, and a deserializer 416. The serializer 406 converts parallel data received from the first electronic device 102 into serial data. The transmitter 408 sends the serial data to the data channel 225. The receiver 418 processes the serial data and sends the processed serial data to the deserializer 416, which converts the serial data back to the parallel data for the second electronic device 104. On the transmitting side, a phase lock loop 410 generates a transmitter clock signal 412 based on a reference clock signal 424, and the transmitter clock signal 412 is applied to control serialization of the data to be transmitted by the data channel 225 of the data link 106.

On the receiving side, a clock data recovery (CDR) circuit 422 is used to recover the receiver clock signal 426 from the serial data received via the data channel 225 and compensate for variation of signal amplitudes caused by loss and other factors in this data channel 225. In some embodiments, the CDR circuit 422 further includes a sampler and a clock recovery circuit. In some embodiments, the CDR circuit 422 is implemented based on one of: a phase-locked loop (PLL), a delay-locked loop (DLL), or a phase interpolator (PI). In some embodiments, the CDR circuit 422 satisfies a BER requirement corresponding to jitter tolerance. Additionally, the CDR circuit 422 complies with a communication interface standard (e.g., PCIe or USB4), is functional with spread spectrum clocking (SSC), and satisfies an electromagnetic interference (EMI) requirement. Under some circumstances, the CDR circuit 422 is configured to be applied in two or more data interfaces having different data rates and signal modulation schemes. The CDR circuit 422 is configurable (e.g., by offering a pull-in frequency range that is greater than a pull-in frequency range threshold and a jitter tolerance that is better than a jitter tolerance threshold). In some embodiments, the CDR circuit 422 is optimized in both of the pull-in frequency range and jitter tolerance.

The receiver clock signal 426 generated by the CDR 422 is used with the receiver 418 and the deserializer 416 to condition the serial data received via the data channel 225 and regenerate the parallel data from the serial data. During this process, the receiver 418 is configured to reduce (1) signal distortion, (2) data spreading over sequential symbols, (3) inter symbol interference (ISI), and (4) resulting bit errors of the serial data on the receiving side of the second electronic device 104. The receiver 418 is configured to generate an output data signal including the stream of data bits 402 in an input data signal of the receiver 418. In some embodiments, the receiver 418 includes a signal conditioning front end applying one or more modulation circuits 450 to compensate for loss from the data channel 225.

Referring to FIG. 4B, in some embodiments, the receiver 418 includes one or more of: a continuous time linear equalizer (CTLE) 436, a variable gain amplifier (VGA) 438, a feed-forward equalizer (FFE) 440B, and a decision feedback equalizer (DFE) 442. The CTLE 436 is configured to selectively attenuate low frequency signal components, amplify signal components around the Nyquist frequency, and remove higher frequency signal components to generate filtered serial data. Stated another way, in some embodiments, the CTLE 436 includes an analog filter designed to equalize the signal loss in certain frequencies. The VGA 438 has a variable gain. The DFE 442 is configured to further amplify the filtered serial data, and recover one or more data bits at each clock switching edge or during each clock cycle. The one or more recovered data bits form data packets. In some embodiments, the FFE 440B includes an FIR filter having a plurality of equalization settings (e.g., FIR coefficients), and is applied to improve signal quality of the data packets via digital signal conditioning (e.g., via high frequency filtering in a digital domain). In some embodiments, feed forward equalization is performed by a transmitter-side FFE 440A, a receiver-side FFE 440B, or both. The transmitter-side FFE 440A is configured to pre-distort the signal to compensate for the lossy data channel 225. In some embodiments, a subset or all of the modulation circuits 450 are applied, and the order of the modulation circuits 450 is optionally identical to or distinct from that shown in FIG. 4B. As such, the receiver 418 receives an input data signal 414 carrying a stream of data bits 402 according to a reference clock frequency (e.g., the reference clock signal 424 in FIG. 4A), and outputs an output data signal 404 including a stream of recovered data bits 404 that is consistent with the stream of data bits 402, thereby reliably keeping the stream of data bits 402 in the input data signal 414.

In some embodiments of this application, in-situ adaptation is implemented on different modulation circuits 450 of an electronic device (e.g., at a second electronic device 104 in FIG. 1). The electronic device includes a sequence of modulation circuits 450, and each modulation circuit has one or more adjustable configurations. The electronic device obtains an input data signal 414. The sequence of modulation circuits 450 processes the input data signal 414 and generates an equalized data signal 444 including a first data sample. The electronic device determines the first residual error of the first data sample, and adjusts the first adjustable configuration of the first modulation circuit (e.g., the CTLE 436) based on the first residual error. A second adjustable configuration of a second modulation circuit (e.g., the VGA 438) is further adjusted based on the first adjustable configuration. In some embodiments, a single receiver integrated circuit (IC) includes the sequence of modulation circuits 450 and is configured to operate with different data rates, ambient temperatures, protocols, cables, and operating environments. Each modulation circuit 450 of the receiver 418 is highly programmable and adaptive to offer different equalizer strengths and configurations in support of highly variable operating conditions. In-situ and real-time adaptations of the modulation circuits 450 are implemented dynamically, jointly, and iteratively without interfering with each other. As the operating conditions (e.g., ambient temperature) change in real time during operation, in-situ and real-time adaptation of the receiver 418 makes the data communication link 106 transmit data reliably and adjustably in response to variations of the operating conditions.

Figure 5:
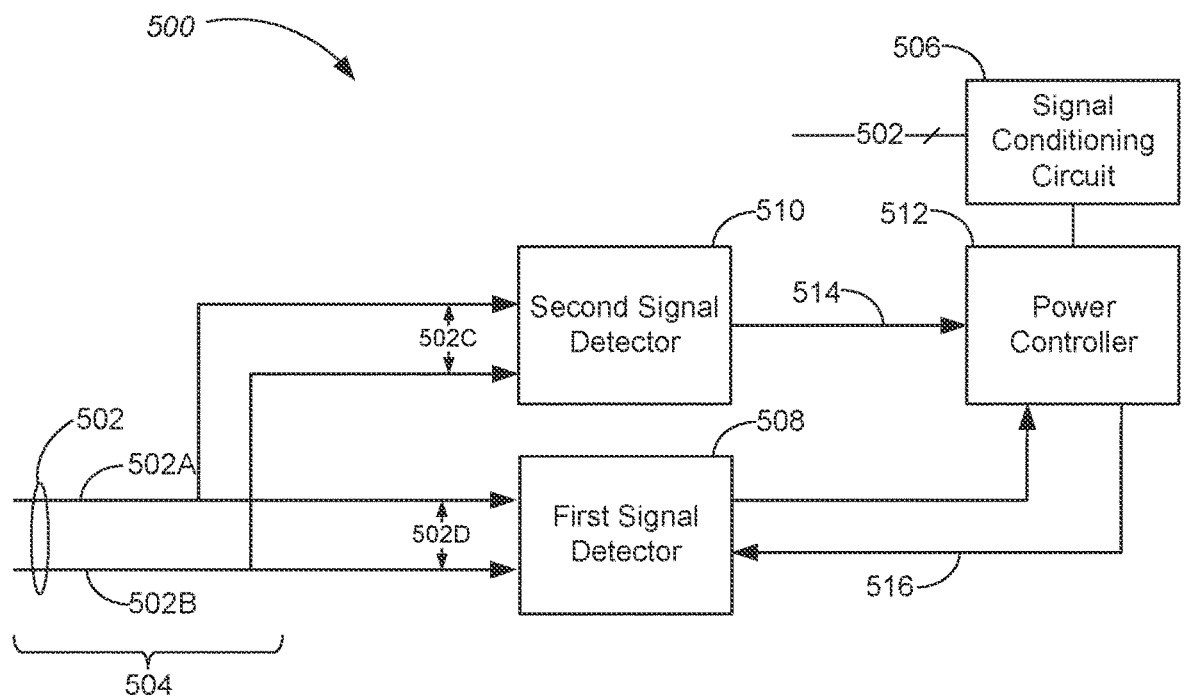
FIG. 5 is a block diagram of an example data interface of a retimer in a data link, in accordance with some embodiments.

FIG. 5 is a block diagram of an example data interface 500 of a retimer 320 in a data link 106, in accordance with some embodiments. The data interface 500 integrates detection of a common mode component 502C and a differential mode component 502D of an input signal 502 to control a low power mode reliably, while having a substantially low power level (e.g., less than a low power threshold) in the low power mode. The data interface 500 includes an input interface 504, a signal conditioning circuit 506, a first signal detector 508, and a second signal detector 510. In some embodiments, the signal conditioning circuit 506 includes a retimer 320 (FIGS. 3A-3B) of the data interface 500, and the data interface 500 is configured to comply with a high-speed data communication protocol, such as USB, DP, or HDMI. For example, the signal conditioning circuit 506 includes one or more of a serializer 406, a transmitter 408, a PLL 410, a receiver 418, and a deserializer 416, and a CDR 422, as shown in FIG. 4A.

The input interface 504 is configured to receive the input signal 502. In some embodiments, the input interface 504 is coupled to a processor of an electronic device (e.g., the device 102 in FIG. 1) and configured to receive the input signal 502 from the processor. Alternatively, in some embodiments, the input interface 504 is coupled to an external load device of the electronic device and configured to receive the input signal 502 from the external load device. The signal conditioning circuit 506 is coupled to the input interface 504, and configured to be disabled and consume power below a first threshold power level $P_{T1}$ in a low power mode. In an example, the signal conditioning circuit 506 is shut down and does not consume power (except for leakage current) in the low power mode. The first signal detector 508 is coupled to the signal conditioning circuit 506, and configured to monitor a differential mode component 502D of the input signal 502 for controlling the signal conditioning circuit 506 to exit the low power mode. The second signal detector 510 is coupled to the first signal detector 508. The second signal detector 510 is configured to, in the low power mode, detect a start of the input signal 502 and enable the first signal detector 508 based on the common mode component 502C of the input signal 502.

In some embodiments, the second signal detector 510 is configured to, in the low power mode, detect the start of the input signal in accordance with a determination that the common mode component 502C of the input signal 502 changes more than a threshold variation and reaches a common mode voltage. In some embodiments, the first signal detector 508 is configured to be disabled and consume power below a second threshold power level $P_{T2}$ before the second signal detector 510 enables the first signal detector 508 in the low power mode. For example, the first signal detector 508 is powered off and does not consume power (except for leakage current) in the low power mode, until it is enabled in response to detection of the start of the input signal by the second signal detector 510.

In some embodiments, the input signal 502 includes a pair of differential input signals 502A and 502B. The common mode component 502C of the input signal 502 corresponds to the average of the pair of differential input signals. The differential mode component 502D of the input signal 502 includes the difference of the pair of differential input signals. The first signal detector 508 and the second signal detector 510 are applied to detect the differential mode component 502D and the common mode component 502C of the input signal 502, respectively. In some embodiments, the common mode component 502C is substantially low, and has a common mode frequency $f_C$ that is lower than a first threshold frequency. The differential mode component 502D has a differential frequency $f_D$ that is higher than a second threshold frequency that is greater than the first threshold frequency. For example, the common mode frequency $f_C$ is lower than 10 Hz, and the differential frequency $f_D$ is higher than 1 GHz. In some embodiments, after the input signal 502 reaches the data link 106, the common mode component 502C of the input signal 502 varies and settles in an extended duration of time (e.g., a few microseconds), and the differential mode component 502D is larger in magnitude, and lasts for a longer duration, than the common mode component 502C. As such, the input signal 502 can be more reliably detected from the differential mode component 502D than the common mode component 502C.

In some embodiments, the first signal detector 508 is further configured to determine whether the differential mode component 502D of the input signal 502 satisfies a low power exiting condition. Further, in some embodiments, the data interface 500 further includes a power controller 512 coupled to the first signal detector 508, the second signal detector 510, and the signal conditioning circuit 506. The power controller 512 is configured to control the signal conditioning circuit 506 to exit the low power mode in accordance with a determination that the differential mode component 502D of the input signal 502 satisfies the low power exiting condition. Conversely, in some embodiments, the data interface 500 further includes a power controller 512 coupled to the first signal detector 508, the second signal detector 510, and the signal conditioning circuit 506. The power controller 512 is configured to keep the signal conditioning circuit 506 in the low power mode in accordance with a determination that the differential mode component 502D of the input signal 502 fails the low power exiting condition. In some embodiments, in accordance with the low power exiting condition, the differential mode component 502D is greater than the threshold differential level for at least a first predefined extended duration of time (e.g., greater than 500 mV for at least 100 microseconds).

In some embodiments, the power controller 512 is configured to receive a start detection signal 514 indicating the start of the input signal 502 from the second signal detector 510 and enable the first signal detector 508 via a start initiation signal 516 in response to the start detection signal 514. In some embodiments, the power controller 512 is configured to control the signal conditioning circuit 506 to exit the low power mode and initiate an operating mode based on the low power exiting condition. Alternatively, in some embodiments, the power controller 512 is configured to control the signal conditioning circuit 506 to exit the operating mode in response to detection of the absence of the differential mode component 502D of the input signal 502.

In various embodiments of this application, both the common mode component 502C and the differential mode component 502D of the input signal 502 are used to detect the input signal 502 reliably, thereby controlling the signal conditioning circuit 506 (e.g., redriver and/or retimer) of a data link 106 to exit the low power mode in a reliable manner. If enabled to detect the input signal 502, the first signal detector 508 has a higher signal bandwidth than the second signal detector 510, and relies on the differential mode component 502D that is more sustainable than the common mode component 502C of the input signal 502, which only lasts for a few microseconds. However, the first signal detector 508 consumes a higher level of power than the second signal detector 510. For energy conservation in the low power mode, the second signal detector 510 is enabled constantly and configured to enable the first signal detector 508 only in response to detection of a start of the input signal 502. The first signal detector 508 is further applied to confirm the existence of the input signal 502 for controlling the signal conditioning circuit 506 to exit the low power mode in a reliable manner. By these means, power consumption of the data interface 500 is preserved in the low power mode while the input signal 502 is still reliably detected by the first and second signal detectors 508 and 510.

In some situations, the first signal detector 508 is enabled in the low power mode, and detects the differential mode component 502D of the input signal 502. A main link (e.g., the signal conditioning circuit 506) of the data interface 500 is enabled and exits the low power mode. Alternatively, in some situations, the first signal detector 508 is enabled and does not get the differential mode component 502D of the input signal 502 (e.g., in an extended duration of time, such as 1 second). The first signal detector 508 is disabled and enters the low power mode in which the first signal detector 508 consumes little or no power.

Figure 6:
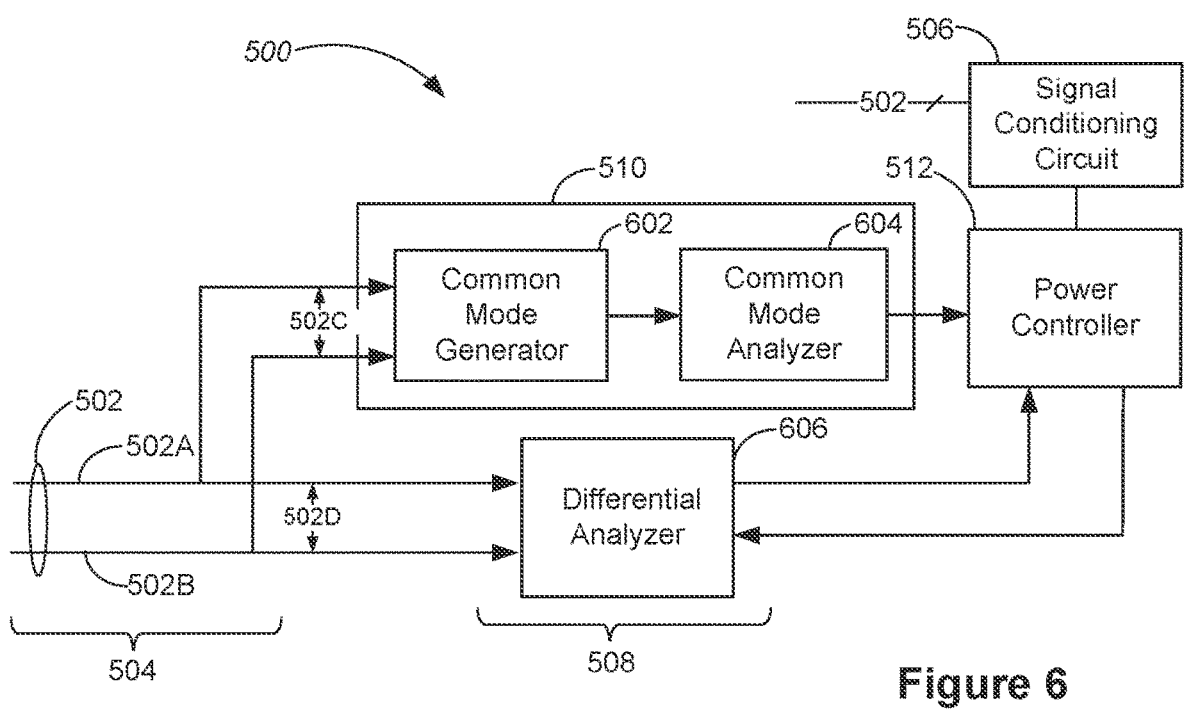
FIG. 6 is a block diagram of another example data interface of a retimer in a data link, in accordance with some embodiments.

FIG. 6 is a block diagram of another example data interface 500 of a retimer 320 in a data link 106, in accordance with some embodiments. The data interface 500 includes an input interface 504, a signal conditioning circuit 506, a first signal detector 508, and a second signal detector 510. The input interface 504 is configured to receive the input signal 502. The signal conditioning circuit 506 is coupled to the input interface 504, and configured to be disabled and consume power below a first threshold power level $P_{T1}$ in a low power mode. The first signal detector 508 is coupled to the signal conditioning circuit 506, and configured to monitor a differential mode component 502D of the input signal 502 for controlling the signal conditioning circuit 506 to exit the low power mode. The second signal detector 510 is coupled to the first signal detector 508. The second signal detector 510 is configured to, in the low power mode, detect a start of the input signal 502 and enable the first signal detector 508 based on a common mode component 502C of the input signal 502. The first signal detector 508 is powered off or disabled at a start of the low power mode, and has to be enabled by the second signal detector 510 upon detection of the start of the input signal 502 to confirm the start of the input signal 502 in a reliable manner.

In some embodiments, the second signal detector 510 further includes a common mode generator 602 and a common mode analyzer 604. The common mode generator 602 is applied to extract the common mode component 502C of the input signal 502. The common mode analyzer 604 is coupled to the common mode generator 602, and configured to monitor the common mode component 502C to detect the start of the input signal based on the common mode component 502C. In some embodiments, the first signal detector 508 includes a differential analyzer 606 configured to monitor a differential mode component 502D in the input signal 502. In some embodiments, the power controller 512 is coupled to the common mode analyzer 604 and the differential analyzer 606, and configured to control the low power mode of the signal conditioning circuit 506. For example, the power controller 512 is configured to control exiting of the low power mode in accordance with a determination that the differential mode component 502D of the input signal 502 satisfies the low power exiting condition (e.g., the differential mode component 502D is greater than the threshold differential level for at least a first predefined extended duration of time). The power controller 512 is configured to keep the signal conditioning circuit 506 in the low power mode in accordance with a determination that the differential mode component 502D of the input signal 502 does not satisfy the low power exiting condition (e.g., the differential mode component 502D is not greater than the threshold differential level for at least the first predefined extended duration of time).

Referring to FIGS. 5 and 6, in some embodiments, the signal conditioning circuit 506 has an operating mode in addition to the low power mode, and the signal conditioning circuit 506 is configured to start and exit the operating mode based on the differential mode component 502D of the input signal 502. Further, in some embodiments, the first signal detector 508 is configured to detect the absence of the differential mode component 502D of the input signal 502 in the operating mode, and the signal conditioning circuit 506 is configured to exit the operating mode and start the low power mode in response to detection of the absence of the differential mode component 502D of the input signal 502. Additionally, in some embodiments, the first signal detector 508 is configured to detect the absence of the differential mode component 502D of the input signal 502, in accordance with a determination that the differential mode component 502D is lower than a threshold differential level for at least a second extended duration of time.

In some embodiments, in the low power mode, the power controller 512 disables the signal conditioning circuit 506 and the differential analyzer 606, and enables the common mode analyzer 604 to analyze the common mode component 502C of the input signal 502. The common mode analyzer 604 includes two reference voltages, e.g., a high reference voltage VH and a low reference voltage VL. The common mode analyzer 604 is configured to, in the low power mode, detect the start of the input signal 502 in accordance with a determination that the common mode component 502C of the input signal 502 changes more than a threshold variation and reaches a common mode voltage (e.g., between the reference voltages VH and VL). In response to detection of the start of the input signal 502, the differential analyzer 606 is enabled. A timer is applied with the differential analyzer 606 to determine whether the differential mode component 502D is greater than a threshold differential level for at least a first predefined extended duration of time. In accordance with a determination that the differential mode component 502D is greater than the threshold differential level for at least the first predefined extended duration of time, the signal conditioning circuit 506 is enabled until the differential mode component 502D is not detected by the differential analyzer 606. Conversely, in accordance with a determination that the differential mode component 502D is not greater than the threshold differential level for at least the first predefined extended duration of time, the signal conditioning circuit 506 is disabled and returns to the low power mode. Stated another way, the signal conditioning circuit 506 is disabled and returns to the low power mode, if the differential mode component 502D is less than the threshold differential level or if the differential mode component 502D greater than the threshold differential level lasts for less than the first predefined extended duration of time.

Figure 7:
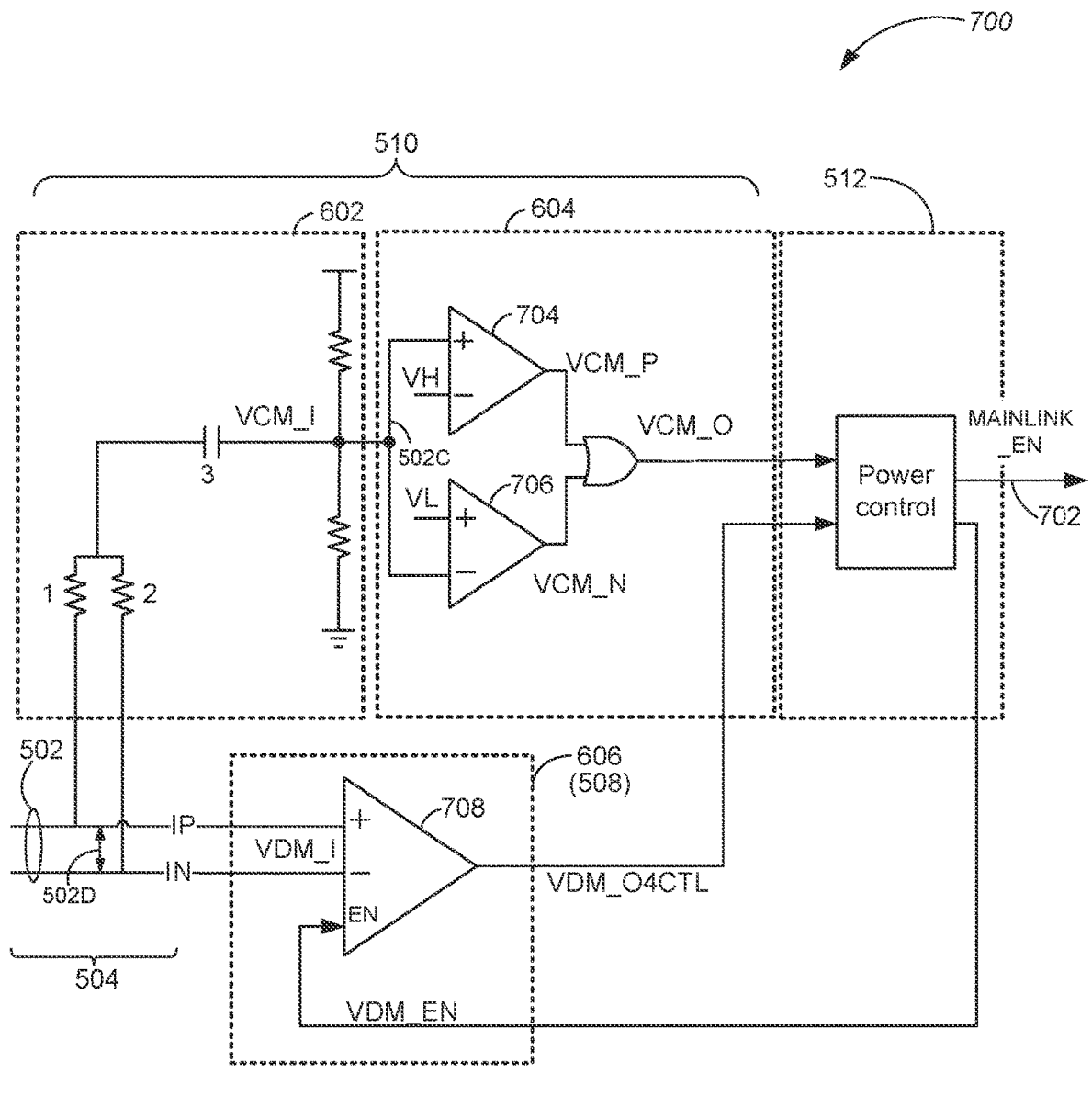
FIG. 7 is a block diagram of a controller of a signal conditioning circuit in a data link, in accordance with some embodiments.
Figure 7:
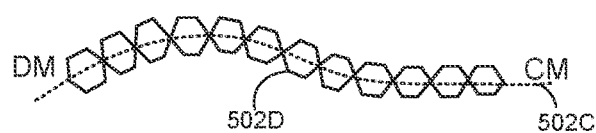
Figure 8:
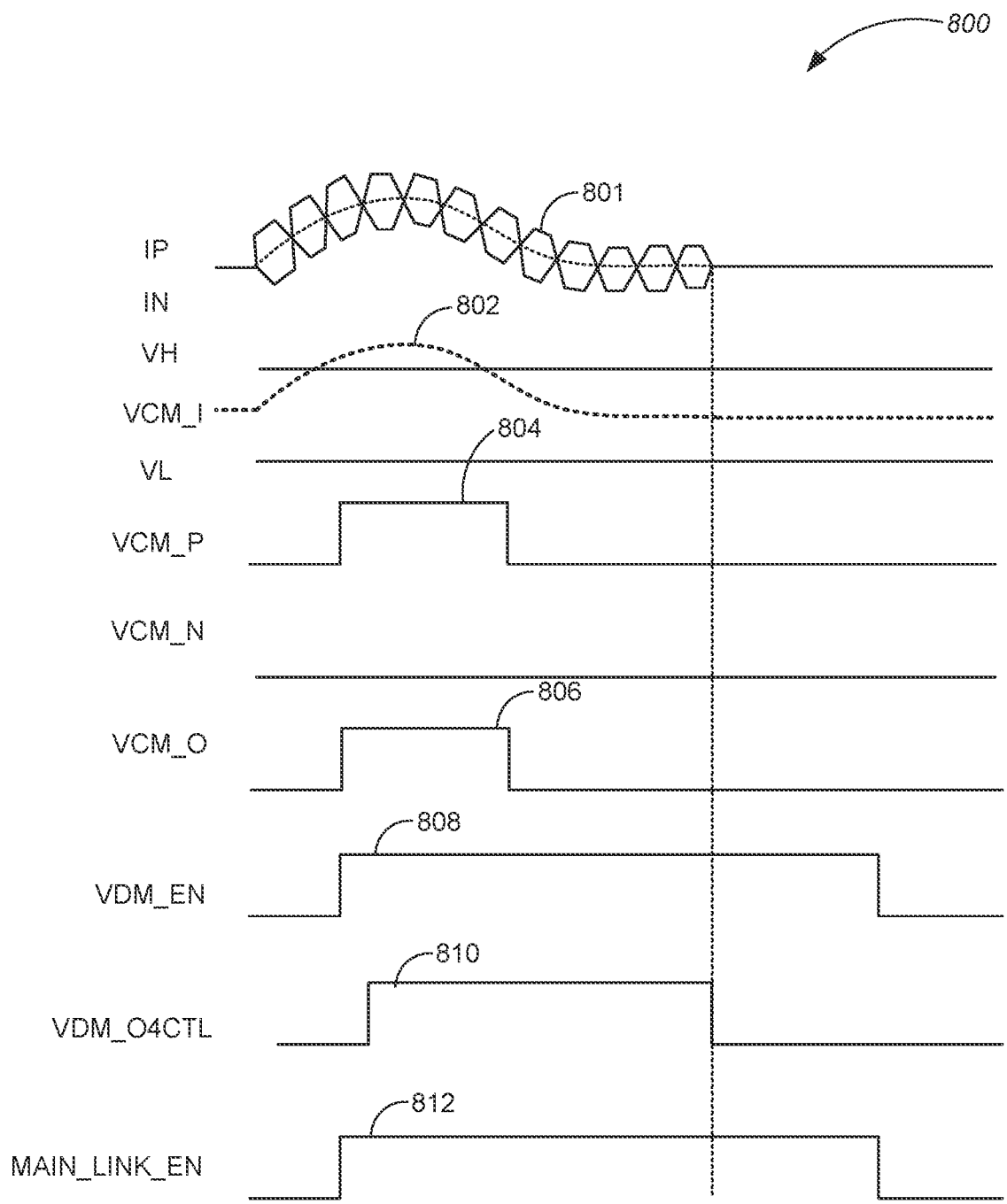
FIG. 8 is a set of temporal diagrams of a plurality of signals generated by a controller, in accordance with some embodiments.

FIG. 7 is a block diagram of a controller 700 of a signal conditioning circuit 506 in a data link 106, in accordance with some embodiments, and FIG. 8 is a set of temporal diagrams of a plurality of signals 800 generated by the controller 700, in accordance with some embodiments. The controller 700 receives an input signal 502 and generates a mainlink enable signal 702 (MAINLINK_EN) for controlling the signal conditioning circuit 506 in a data interface 500 (FIG. 5). The signal conditioning circuit 506 is configured to be disabled and consume power below a first threshold power level $P_{T1}$ in a low power mode. The controller 700 includes an input interface 504, a second signal detector 510 having a common mode generator 602 and a common mode analyzer 604, a first signal detector 508 having a differential analyzer 606, and a power controller 512. The input interface 504 is configured to receive the input signal 502. The first signal detector 508 is configured to monitor a differential mode component 502D of the input signal 502 for controlling the signal conditioning circuit 506 to exit the low power mode. The second signal detector 510 is coupled to the first signal detector 508. The second signal detector 510 is configured to, in the low power mode, detect a start of the input signal 502 and enable the first signal detector 508 based on a common mode component 502C of the input signal 502.

In some embodiments, the input signal 502 includes a pair of differential input signals 502A (IP) and 502B (IN), as shown in FIGS. 5 and 6. The common mode component 502C (VCM_I) of the input signal 502 corresponds to the average of the pair of differential input signals. The differential mode component 502D (VDM_I) of the input signal 502 uses the difference of the pair of differential input signals 502A (IP) and 502B (IN).

In some embodiments, the common mode generator 602 includes an RC network having one or more resistors and one or more capacitors. The RC network forms a low pass filter that has a characteristic frequency, and is configured to reduce or remove high frequency components of the input signal 502 above the characteristic frequency, thereby generating the common mode component 502C (VCM_I) of the input signal 502. Referring to FIG. 8, the common mode component 502C (VCM_I) has a common mode frequency that is lower than the first threshold frequency (e.g., the characteristic frequency of the RC network). In some situations, as the input signal 502 comes into the data link 106, the common mode component 502C (VCM_I) varies and settles in an extended duration of time (e.g., a few microseconds), and the differential mode component 502D (VDM_I) has a higher frequency, is larger in magnitude, and lasts for a longer duration, than the common mode component 502C.

In some embodiments, the common mode analyzer 604 includes two comparators 704 and 706 configured to receive a high reference voltage VH and a low reference voltage VL (see FIG. 8), respectively. When the input signal 502 does not exist or when the common mode component 502C of the input signal 502 settles, the common mode component 502C (VCM_I) has a nominal value between the high and low reference voltages VH and VL. In some situations (see FIG. 8), when the input signal 502 comes (801) from an electronic device 102 (see FIGS. 1 and 2), the common mode component 502C increases (802) beyond the high reference voltage VH. The control signal VCM_P is enabled (804), and so is (806) the control signal VCM_O. Alternatively, in some situations not shown, when the input signal 502 comes from the electronic device 102, the common mode component 502C drops below the low reference voltage VL. The control signal VCM_N is enabled, and so is the control signal VCM_O.

In some embodiments, the power controller 512 is configured to generate a control signal VDM_EN based on the control signal VCM_O. For example, the controller 512 enables (808) the control signal VDM_EN in response to the control signal VCM_O being enabled. In some embodiments, the differential analyzer 606 includes an operational amplifier 708 controlled by the control signal VDM_EN to generate a control signal VDM_O4CTL based on the differential mode component 502D of the input signal 502. In some situations, the control signal VCM_0 is enabled, indicating a start of the input signal 502. In response to the start of the input signal 502, the control signal VDM_EN is enabled (808) to enable operation of the differential analyzer 606. The differential analyzer 606 generates the control signal VDM_O4CTL (810) to confirm whether the input signal 502 comes based on the differential mode component 502D in a reliable manner.

The power controller 512 applies the control signal VCM_O, the control signal VDM_O4CTL, or both to initiate the signal conditioning circuit 506. Specifically, in some embodiments, the power controller 512 is configured to generate the mainlink enable signal 702 based on the control signal VCM_O, the control signal VDM_O4CTL, or both, and the mainlink enable signal 702 controls the low power mode of the signal conditioning circuit 506 of the data interface 500 (see FIG. 5). In an example, the mainlink enable signal 702 is enabled (812) to terminate the low power mode in accordance with a determination that the control signal VDM_O4CTL is enabled and the differential mode component 502D is greater than the threshold differential level for at least a first predefined extended duration of time.

Figure 9:
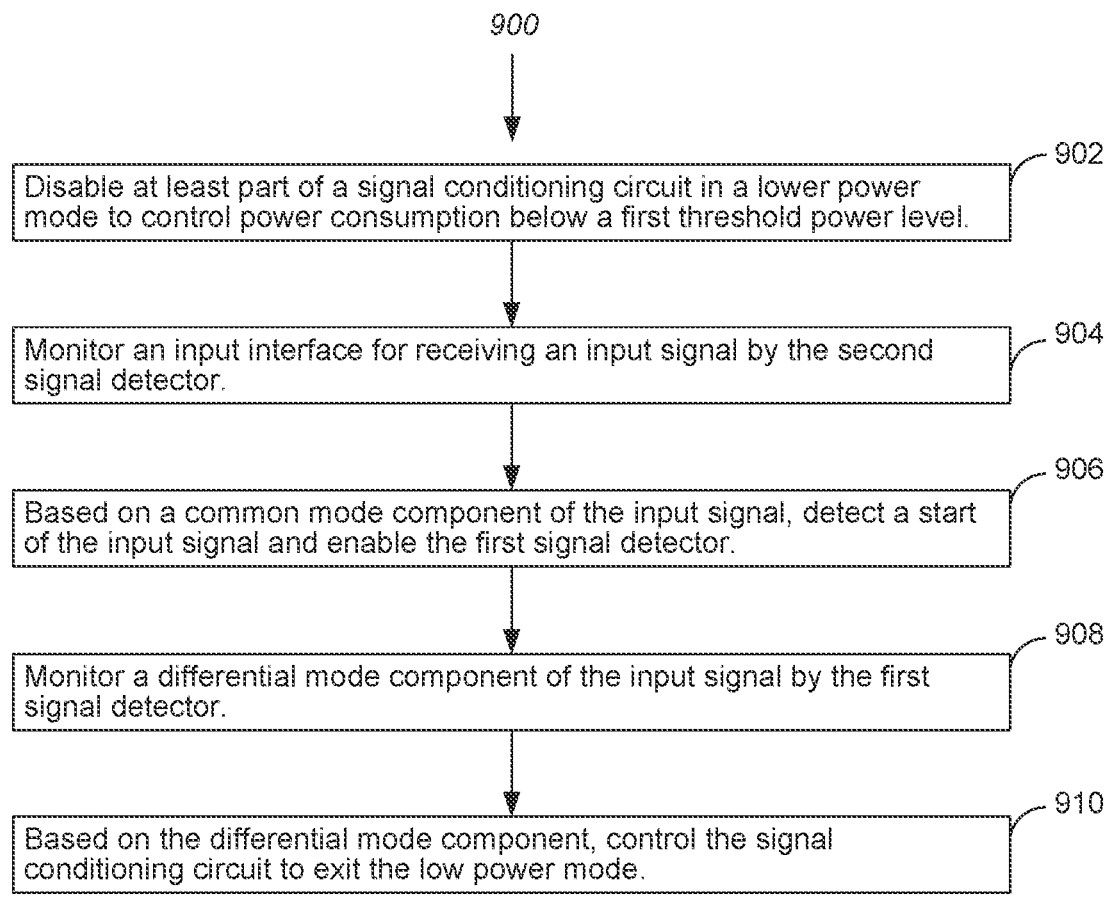
FIG. 9 is a flow diagram of an example method for controlling a data interface of a data link, in accordance with some embodiments.

FIG. 9 is a flow diagram of an example method 900 for controlling a data interface 500 of a data link 106, in accordance with some embodiments. For convenience, the method 900 is described as being implemented by an electronic device associated with the data interface 500 and having a first signal detector 508 and a second signal detector 510. The electronic device disables (902) at least part of a signal conditioning circuit 506 in a lower power mode to control power consumption below a first threshold power level $P_{T1}$ and monitors (904) the input interface 504 for receiving an input signal 502 by the second signal detector 510. Based on a common mode component 502C of the input signal 502, the electronic device detects (906) a start of the input signal 502 and enables a first signal detector 508. The electronic device monitors (908) a differential mode component 502D of the input signal 502 by the first signal detector 508. Based on the differential mode component 502D, the signal conditioning circuit 506 is controlled (910) to exit the low power mode.

In some embodiments, the common mode component 502C has a common mode frequency that is lower than a first threshold frequency (e.g., 10 Hz), and the differential mode component 502D has a differential frequency (e.g., 1 GHZ) that is higher than a second threshold frequency, which is greater than the first threshold frequency.

In some embodiments, the first signal detector 508 is disabled and consumes power below a second threshold power level before the second signal detector 510 enables the first signal detector 508 in the low power mode.

In some embodiments, in the low power mode, the second signal detector 510 detects the start of the input signal 502 in accordance with a determination that the common mode component 502C of the input signal 502 changes by more than a threshold variation and reaches a common mode voltage.

In some embodiments, the first signal detector 508 determines whether the differential mode component 502D of the input signal 502 satisfies a low power exiting condition. Further, in some embodiments, a power controller 512 is coupled to the first signal detector 508, the second signal detector 510, and the signal conditioning circuit 506. The power controller 512 controls the signal conditioning circuit 506 to exit the low power mode in accordance with a determination that the differential mode component 502D of the input signal 502 satisfies the low power exiting condition. In some embodiments, the power controller 512 is coupled to the first signal detector 508, the second signal detector 510, and the signal conditioning circuit 506. The power controller 512 keeps the signal conditioning circuit 506 in the low power mode when the differential mode component 502D of the input signal 502 does not satisfy the low power exiting condition. Also, in some embodiments, in accordance with the low power exiting condition, the differential mode component 502D is greater than the threshold differential level for at least a first predefined extended duration of time.

In some embodiments, a power controller 512 is coupled to the first signal detector 508 and the second signal detector 510. The power controller 512 receives a start detection signal indicating the start of the input signal 502 from the second signal detector 510 and enables the first signal detector 508 in response to the start detection signal.

In some embodiments, the signal conditioning circuit 506 has an operating mode in addition to the low power mode, and the signal conditioning circuit 506 starts and exits the operating mode based on the differential mode component 502D of the input signal 502. Further, in some embodiments, the first signal detector 508 detects the absence of the differential mode component 502D of the input signal 502 in the operating mode, and the signal conditioning circuit 506 exits the operating mode and starts the low power mode in response to detection of the absence of the differential mode component 502D of the input signal 502. In some embodiments, the first signal detector 508 detects the absence of the differential mode component 502D of the input signal 502, when the differential mode component 502D is lower than the threshold differential level for at least a second extended duration of time. Further, in some embodiments, a power controller 512 is coupled to the second signal detector 510 and the signal conditioning circuit 506. The power controller 512 instructs the signal conditioning circuit 506 to exit the operating mode in response to detection of the absence of the differential mode component 502D of the input signal 502.

In some embodiments, the input signal 502 includes a pair of differential input signals. The common mode component 502C of the input signal 502 specifies the average of the pair of differential input signals. The differential mode component 502D of the input signal 502 specifies the difference of the pair of differential input signals.

In some embodiments, the signal conditioning circuit 506 includes a retimer 320 of the data interface 500, and the data interface 500 is configured to comply with a high-speed data communication protocol, such as Universal Serial Bus (USB), DisplayPort (DP), or High-Definition Multimedia Interface (HDMI).

In some embodiments, the input interface 504 is coupled to a processor of the electronic device and configured to receive the input signal 502 from the processor. Alternatively, in some embodiments, the input interface 504 is coupled to an external load device of the electronic device and configured to receive the input signal 502 from the external load device.

It should be understood that the particular order in which the operations in FIG. 9 has been described is merely exemplary and are not intended to indicate that the described order is the only order in which the operations could be performed. One of ordinary skill in the art would recognize various ways to control clock data recovery for a data communication channel. Additionally, it should be noted that details of other processes and structures described above with respect to FIGS. 1-8 are also applicable in an analogous manner to method 900 described above with respect to FIG. 9. For brevity, these details are not repeated here.

In some embodiments, the method 900 is governed by instructions that are stored on a non-transitory computer readable storage medium and that are executed by one or more processors of the electronic device. Each of the operations shown in FIG. 9 may correspond to instructions stored in a computer memory or non-transitory computer readable storage medium. The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in the method 900 may be combined and/or the order of some operations may be changed.

It will also be understood that, although the terms first and second are used, in some instances, to describe various elements, these elements are not limited by these terms. These terms are only used to distinguish one element from another. For example, a first electronic device can be termed a second electronic device, and, similarly, a second electronic device can be termed a first electronic device, without departing from the scope of the various described embodiments. The first electronic device and the second electronic device are both electronic devices, but they are not the same electronic device.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, steps, operations, elements, and/or components, but do not preclude the presence or addition of one or more other features, steps, operations, elements, components, and/or groups thereof.

As used herein, the term "if" means "when" or "upon" or "in response to determining" or "in response to detecting" or "in accordance with a determination that," depending on the context. Similarly, the phrase "if it is determined" or "if [a stated condition or event] is detected" means "upon determining" or "in response to determining" or "upon detecting [the stated condition or event]" or "in response to detecting [the stated condition or event]" or "in accordance with a determination that [a stated condition or event] is detected," depending on the context.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages can be implemented in hardware, firmware, software, or any combination thereof.

The above description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. An electronic device, comprising:
   an input interface for receiving an input signal;
   a signal conditioning circuit coupled to the input interface, wherein the signal conditioning circuit is configured to be disabled and consume power below a first threshold power level in a low power mode;
   a first signal detector coupled to the signal conditioning circuit, wherein the first signal detector is configured to monitor a differential mode component of the input signal for controlling the signal conditioning circuit to exit the low power mode; and
   a second signal detector coupled to the first signal detector, the second signal detector configured to, in the low power mode, detect a start of the input signal and enable the first signal detector based on a common mode component of the input signal.

2. The electronic device of claim 1, wherein the common mode component has a common mode frequency that is lower than a first threshold frequency, and the differential mode component has a differential frequency that is higher than a second threshold frequency that is greater than the first threshold frequency.

3. The electronic device of claim 1, wherein the first signal detector is configured to be disabled and consume power below a second threshold power level before the second signal detector enables the first signal detector in the low power mode.

4. The electronic device of claim 1, wherein the second signal detector is configured to, in the low power mode, detect the start of the input signal in accordance with a determination that the common mode component of the input signal changes by more than a threshold variation and reaches a common mode voltage.

5. The electronic device of claim 1, wherein the first signal detector is further configured to determine whether the differential mode component of the input signal satisfies a low power exiting condition.

6. The electronic device of claim 5, further comprising:
a power controller coupled to the first signal detector, the second signal detector, and the signal conditioning circuit, the power controller configured to control the signal conditioning circuit to exit the low power mode in accordance with a determination that the differential mode component of the input signal satisfies the low power exiting condition.

7. The electronic device of claim 5, further comprising:
a power controller coupled to the first signal detector, the second signal detector, and the signal conditioning circuit, the power controller configured to keep the signal conditioning circuit in the low power mode in accordance with a determination that the differential mode component of the input signal does not satisfy the low power exiting condition.

8. The electronic device of claim 5, wherein, in accordance with the low power exiting condition, the differential mode component is greater than a threshold differential level for at least a first predefined extended duration of time.

9. The electronic device of claim 1, further comprising:
a power controller coupled to the first signal detector and the second signal detector, the power controller configured to receive a start detection signal indicating the start of the input signal from the second signal detector and enable the first signal detector in response to the start detection signal.

10. The electronic device of claim 1, wherein:
the input signal includes a pair of differential input signals;
the common mode component of the input signal corresponds to an average of the pair of differential input signals; and
the differential mode component of the input signal includes a difference of the pair of differential input signals.

11. The electronic device of claim 1, wherein the signal conditioning circuit includes a retimer of a data interface, and the data interface is configured to comply with a high-speed data communication protocol selected from the group consisting of: Universal Serial Bus (USB), DisplayPort (DP), and High-Definition Multimedia Interface (HDMI).

12. A controller circuit for controlling a signal conditioning circuit, comprising:
an input interface for receiving an input signal;
a first signal detector coupled to the signal conditioning circuit, wherein the first signal detector is configured to monitor a differential mode component of the input signal for controlling the signal conditioning circuit to exit a low power mode, and the signal conditioning circuit is configured to be disabled and consume power below a first threshold power level in the low power mode; and
a second signal detector coupled to the first signal detector, the second signal detector configured to, in the low power mode, detect a start of the input signal and enable the first signal detector based on a common mode component of the input signal.

13. The controller circuit of claim 12, wherein the signal conditioning circuit has an operating mode in addition to the low power mode, and the signal conditioning circuit is configured to start and exit the operating mode based on the differential mode component of the input signal.

14. The controller circuit of claim 13, wherein the first signal detector is configured to detect an absence of the differential mode component of the input signal in the operating mode, and the signal conditioning circuit is configured to exit the operating mode and start the low power mode in response to detection of the absence of the differential mode component of the input signal.

15. The controller circuit of claim 14, wherein the first signal detector is configured to detect the absence of the differential mode component of the input signal, in accordance with a determination that the differential mode component is lower than a threshold differential level for at least a second extended duration of time.

16. The controller circuit of claim 13, further comprising:
a power controller coupled to the second signal detector and the signal conditioning circuit, the power controller configured to control the signal conditioning circuit to exit the operating mode in response to detection of the absence of the differential mode component of the input signal.

17. A method for controlling a data interface, comprising, at an electronic device having a first signal detector and a second signal detector:
disabling at least part of a signal conditioning circuit in a lower power mode to control power consumption below a first threshold power level;
monitoring an input interface for receiving an input signal by the second signal detector;
based on a common mode component of the input signal, detecting a start of the input signal and enabling the first signal detector;
monitoring a differential mode component of the input signal by the first signal detector; and
based on the differential mode component, controlling the signal conditioning circuit to exit the low power mode.

18. The method of claim 17, wherein the input interface is coupled to a processor of the electronic device and the input signal is from the processor.

19. The method of claim 17, wherein the input interface is coupled to an external load device of the electronic device and the input signal is received from the external load device.

20. The method of claim 17, wherein:
the input signal includes a pair of differential input signals;
the common mode component of the input signal includes an average of the pair of differential input signals; and
the differential mode component of the input signal includes a difference of the pair of differential input signals.

* * * * *